May 6, 1924.

J. YOUNG ET AL 1,493,313

FASTENER FOR MACHINE BELTS

Filed Feb. 9, 1923

INVENTORS.
Joseph Young
William Young

Patented May 6, 1924.

1,493,313

UNITED STATES PATENT OFFICE.

JOSEPH YOUNG AND WILLIAM YOUNG, OF BOLTON, ENGLAND.

FASTENER FOR MACHINE BELTS.

Application filed February 9, 1923. Serial No. 617,947.

*To all whom it may concern:*

Be it known that we, JOSEPH YOUNG and WILLIAM YOUNG, both British subjects, both residing at Bolton, county of Lancaster, England, have invented certain new and useful Improvements in Fasteners for Machine Belts, of which the following is a specification.

This invention relates to fasteners for driving belts of the type in which eyes are formed at the ends of the belt by bent wires or pins the ends of which are driven into the belt whilst the eyes or loops overhang the end of the belt, the belt ends being then connected by a pin or rod passed transversely through the eyes.

According to the invention the fastener comprises a number of pins, each formed with two superimposed members to enter the belt and a loop or eye at one end the ends or points of both members bent at right angles to drive into the belt and so shaped that the eye when in position will lie below the underside of the belt.

The invention will be fully described with reference to the accompanying drawings.

Figures 2, 3:
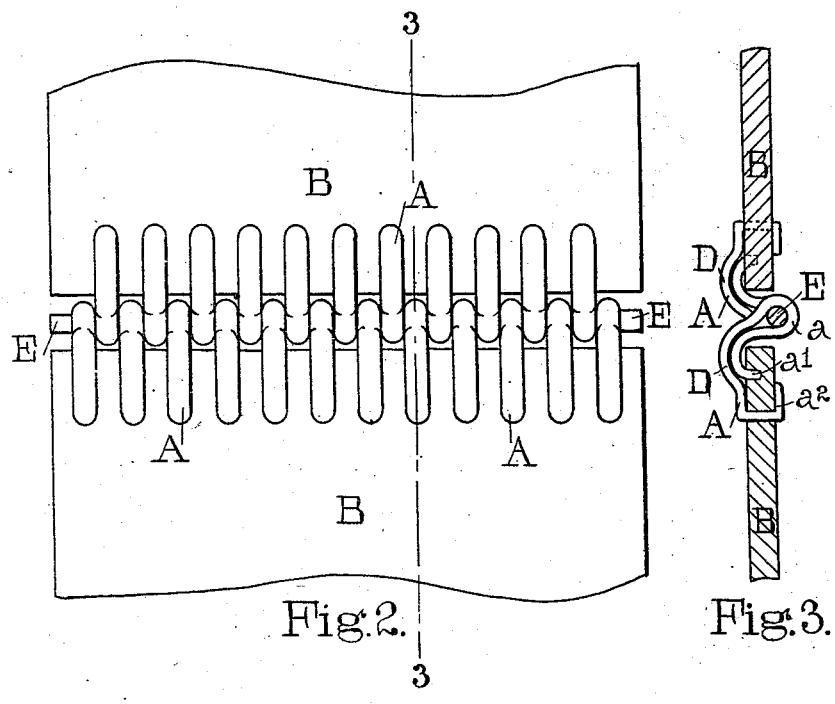
Fig. 2 is a face view of belt ends showing fasteners in position making the joint.
Fig. 3 is a longitudinal section through belt on line 3—3 Fig. 2.
Figure 1:
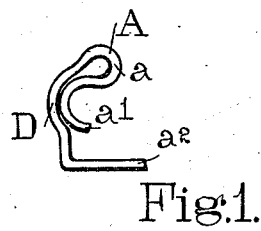
Fig. 1 is a side view of one of the double membered looped pins which form the fastener.

The fastener comprises a number of pins A to be driven into the belt ends B. Each pin is formed with a loop $a$ at one end and the leg or member $a'$ cut shorter than the leg or member $a^2$. The longer leg $a^2$ is bent at right angles and is sufficiently long to penetrate the belt and be turned and clenched over on the reverse side, and the shorter leg is bent into a hook to enter the belt but not sufficiently long to pass completely through. The pin is so shaped or bent at D as to bring the loop $a$ to one side of the longitudinal axis so that it may be over the end of the belt and below the under surface to rest upon and be supported by the periphery of a pulley when passing round it thereby preventing any tendency of the pins being wrenched out of position when the belt is running.

The pins are forced or driven into the ends of the belt by a hammer or press and the long leg clinched on the underside of the belt, the eyes $a$ extending over the ends. The two ends of the belt are brought together and a pin or rod E of metal, raw hide or other material passed through the eyes $a$ to secure the two ends of the belt together.

The fastening may be applied to all types of driving belts of a width to take at least three pins such as leather, balata, cotton, hair or other material.

What we claim as our invention and desire to protect by Letters Patent is:—

A belt fastener of the type referred to in which each pin comprises a long member passing through the belt and clenched over the underside thereof, a short member below the long member entering the belt but not passing through it, a looped portion connecting the two members together and extending below the underside of the belt and a curved portion on each member whereby the two members will be one on top of the other.

In testimony whereof we have hereunto set our hands in presence of two subscribing witnesses.

JOSEPH YOUNG.
WILLIAM YOUNG.

Witnesses:
J. OWDEN O'BRIEN,
GEORGE H. O'BRIEN.